United States Patent

Silvius

[15] 3,687,500

[45] Aug. 29, 1972

[54] CONNECTING CONSTRUCTION FOR SHEET MEMBERS

[72] Inventor: Arthur Aurelius Xaverius Silvius, 34, Leerdamseweg, Asperen, Netherlands

[22] Filed: Feb. 9, 1970

[21] Appl. No.: 9,732

[30] Foreign Application Priority Data
Feb. 18, 1969 Netherlands............6902537

[52] U.S. Cl.....287/189.36 D, 287/189.36 F, 52/582, 46/31
[51] Int. Cl................................................F16b 5/06
[58] Field of Search...........287/189.36 F, 189.36 C, 189.36 D, 287/189.36 R, 20.92 R, 20.92 C, 54 A, 54 C, 189.35; 52/282, 285, 582; 46/25, 31

[56] References Cited

UNITED STATES PATENTS

| | | | |
|---|---|---|---|
| 2,984,935 | 5/1961 | Beck | 46/25 |
| 3,177,611 | 4/1965 | Beck | 46/25 |
| 3,564,758 | 2/1971 | Willis | 46/31 |
| 2,697,873 | 12/1954 | Cooke, Jr. | 287/189.36 F X |
| 2,832,100 | 4/1958 | Swallert | 287/20.92 C X |
| 3,142,610 | 7/1964 | Lowe | 287/189.36 D X |
| 3,399,914 | 9/1968 | Grant | 287/189.35 R |

*Primary Examiner*—David J. Williamowsky
*Assistant Examiner*—Wayne L. Shedd
*Attorney*—Hall and Houghton

[57] ABSTRACT

For interconnecting mutually perpendicular sheet members, connectors are spaced along the edges of such members, each connector comprising four slots which extend radially inwardly from the periphery, mutually enclose angles of 90°, and have widths which tend at least in part to be narrower than the thickness of the sheet members and thus flexibly clamp the same. Each connector may be formed as a one piece plate of rigidly flexible and deformable material; or have one or more plates of flexible material between and deformable by adjustable clamping plates of stiffer material; or may be built up of a number of uniform plates of stiff material interconnected by pins of flexible deformable material extending through holes in such plates, the holes in one plate being staggered with respect to the holes in adjacent plates.

5 Claims, 6 Drawing Figures

ARTHUR A.X. SILVIUS,
INVENTOR

BY [signature]

ATTORNEY

INVENTOR
ARTHUR A. X. SILVIUS,
BY Hall & Houghton
ATTORNEY

CONNECTING CONSTRUCTION FOR SHEET MEMBERS

CROSS REFERENCE TO RELATED APPLICATION

This application corresponds to Dutch application Nr. 69.02537 dated Feb. 18, 1969, incorporated herein by reference, and relies thereon for priority.

BACKGROUND OF THE INVENTION

1. Field of the Invention

The invention relates to a connecting construction for sheet members, more particularly to a construction for a mutually perpendicular connection of sheet members comprising connectors which may be fitted at spaced intervals along the sides of the members to be connected.

2. Description of the Prior Art

There are connectors known for the mutually perpendicular connection of sheet members which are fitted at spaced intervals along the sides of the members to be connected, by which arrangement a stable connection may be provided even when connecting fairly long sheet members without the bodies being formed by the sheet members being disfigured by massive connectors on their sides.

Such a connection is known from the Dutch Patent Application 66,09005 in which a connection is described for the mutually perpendicular connection of sheet members with a thickness of at least 5 mm, which couplings, comprising at least two rigidly interconnected plate shaped projections perpendicular with respect to each other and having a thickening at their end, are positioned in specially provided recesses in the sheet members to be connected.

A disadvantage of these connections is that the sheet members to be connected have to be provided with recesses which renders these connecting constructions less suitable for use in connecting sheets of glass, for example. Furthermore, the connectors used are of a rather complicated design and the members to be connected have to be adapted to the connectors. Therefore the connectors cannot be universally applied.

SUMMARY OF THE INVENTION

It is the object of the present invention to provide a connecting construction for sheet members which does away with the aforesaid disadvantages and this object has been achieved according to the invention by the fact that each connector consists of a body which has been provided with four circumferential slots mutually enclosing angles of 90° and extending radially inwards, said slots having a width, at least across part of their length, which is a bit less than the thickness of the sheet members to be connected, and flexibly clamping down the sheet members.

The connectors according to the invention are of simple design and may be manufactured in a simple way. They may be fitted in a very simple manner at any chosen location along the edges of the sheet members to be connected by forcing the sheet members with their edges into the slots, because of which they will be flexibly clamped down. Four mutually perpendicular sheet members may be attached to each connector.

A preferred embodiment may be obtained according to the invention in that each connector has been formed from one piece of rigidly flexible material and is plateshaped.

The plateshaped connectors are eminently suitable for building up display stands from sheets of glass. Owing to their relatively small thickness, these members have no interfering effect on the display stands built up from sheets of glass. In addition to this the plateshaped connectors may be designed in the form of standard members suitable for connecting sheets of glass, the thickness of which may vary within not too strict limits, while a large number of constructions may be formed. The clamping gripping hold of the slots on the sheets to be connected is due to the flexible properties of the material of the connectors. It may be noted that a better hold is obtained when more sheets are connected by the connector, because the insertion of a sheet in the slot of the connector will cause the adjacent slots to contract due to flexible deformations in the material, and this results in a better clamping action.

A further embodiment according to the invention is obtained in that each of the connectors has been built up from a number of uniform plateshaped members, a member of more flexible material being clamped between every two members of a more rigid material, while means have been provided for mutually connecting the sheet members by means of an adjustable clamping force.

The flexible material of the members of a more flexible material will as a result of the axial forces exerted thereon by the members of a more rigid material expand in a radial direction, this causes the slots provided in the members of a more flexible material to contract. In this way the width of the slots can be varied by varying the clamping force with which the sheet members have been interconnected and this makes the connectors suitable for interconnecting sheets that are thinner than the width of the slots in the connectors. In addition to this the clamping force exerted on the sheets to be connected may be adjusted at will.

Still another embodiment is obtained according to the invention by the fact that each connector has been built up from a number of uniform plateshaped members of relatively stiff material which have been interconnected by one or more pins of flexible material extending axially through holes fitted in the plateshaped members, the holes in the plateshaped members being staggered with respect to the holes in the adjacent members.

As the holes in the plateshaped members, which are adapted to pass the connecting pins, are staggered in relation to each other, the plateshaped members will be staggered in relation to each other in unloaded conditions and as a result of this the slots in the plateshaped members will also be staggered in relation to each other. As a result the distance between one wall of a slot of a plateshaped member in the stacked members and the opposite wall of a slot of a successive plateshaped member will be smaller than the width of the slots in the plateshaped members. If a sheet to be connected with a thickness of about the width of a slot in one plateshaped member is passed through the stack of plateshaped members, the individual plateshaped members will be moved with respect to each other in such a way that their slots are in line. This results in a flexible deformation of the flexible pin in radial direction, because of which a flexible clamping force is exerted on the edges of the sheets to be connected.

BRIEF DESCRIPTION OF THE DRAWINGS

In the accompanying drawings of illustrative embodiments of the invention.

DESCRIPTION OF THE PREFERRED EMBODIMENTS

Figure 1:
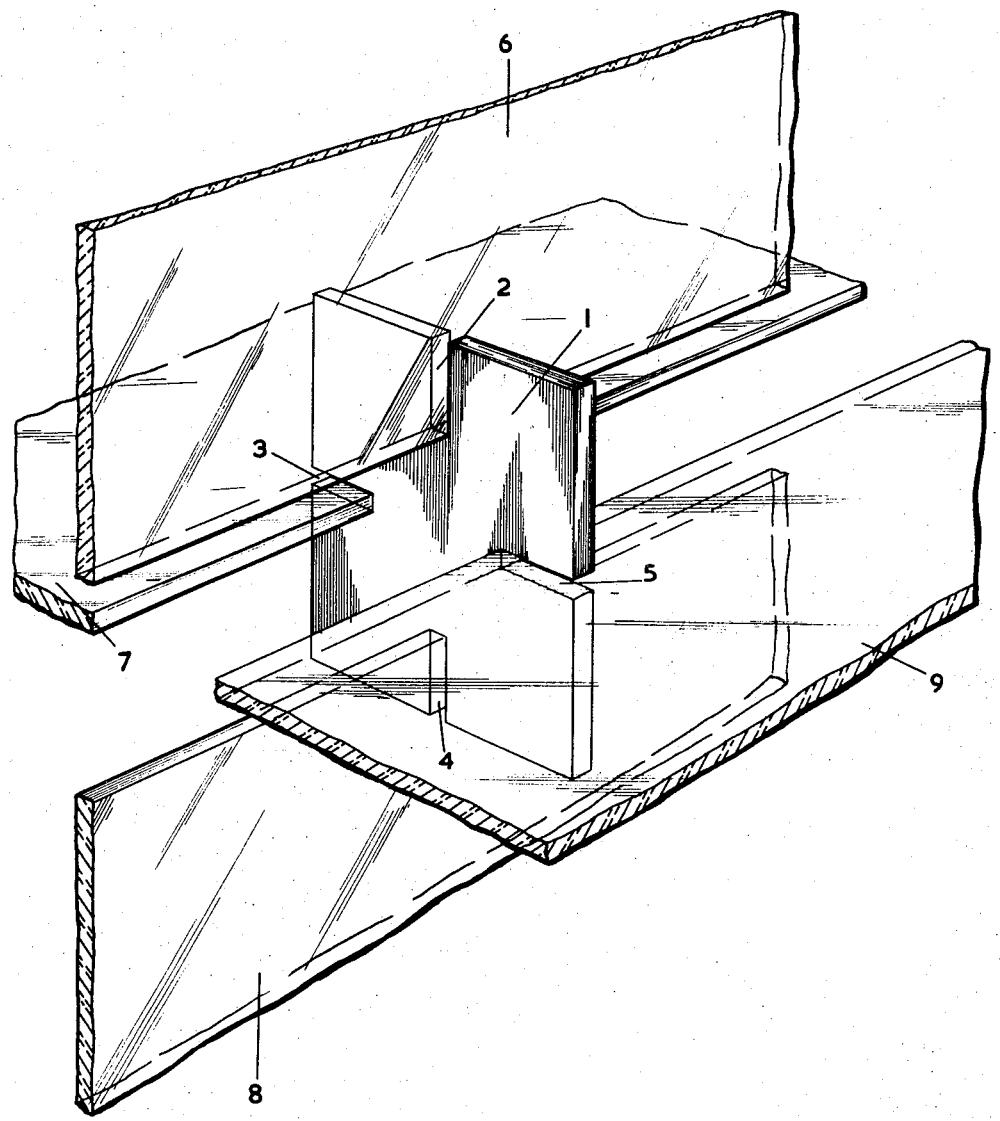
FIG. 1 shows a perspective view of a connection between four mutually perpendicular sheets of glass which has been brought about by means of a plateshaped connector according to the invention.

FIG. 1 illustrates a connector according to the invention consisting of a square plateshaped body 1, manufactured from flexible material, for example, a synthetic material such as polyethylene. The body 1 has been provided with four circumferential slots 2, 3, 4 and 5 mutually enclosing angles of 90°. In each of these slots a sheet of glass 6, 7, 8 and 9, respectively, has been placed, the thickness of the sheets being greater than the width of the slots because of which the sheets of glass are clamped by the walls of the slots acting as clamping jaws. Because the material of the element 1 is resilient, in inserting the sheet 7 in the slot 3, for example, the slots 2 and 4 will slightly contract so that the clamping force of the walls of these slots acting as clamping jaws is increased. The same is true of the other slots. When the slots 2, 3, 4 and 5 are fully loaded, the body 1 will exert the greatest clamping force on the bodies to be connected. More elements 1 may be placed along the sides of the sheets of glass 6, 7, 8 and 9 if desired.

Figure 2:
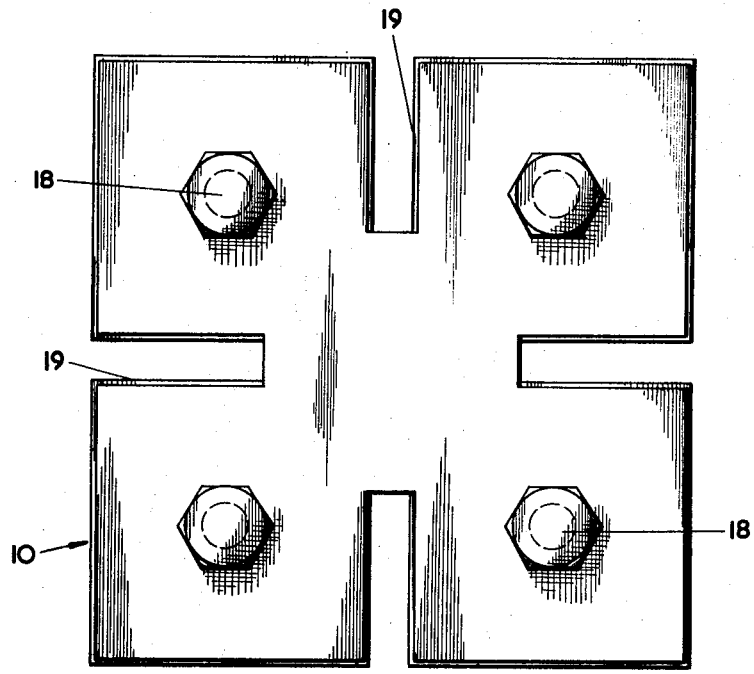
FIG. 2 shows a front view of a connector according to the invention comprising a number of uniform, alternatively stiff and more flexible plateshaped members which have been interconnected by means of long bolts and nuts.

FIG. 2 shows a front view of a connector 10 which has been built up from a number of uniform plateshaped members 11, 12, 13, 14 and 15 which are similar in form to the plateshaped element 1 shown in FIG. 1, which have been manufactured from a different material, however. In the shown embodiment the members 11, 13 and 15 consist of stiff material, whereas the members 12 and 14 between those members are manufactured from a softer flexible deformable material. The plateshaped members are placed against each other in such a way that they fully cover one another, the slots of the successive members being in line and forming one continuous slot in the built-up stack of members. The plateshaped members are interconnected by four bolts and nuts, the bolts extending through holes in the plateshaped members. In the illustrated embodiment each plate member has four holes for passing the connecting pins, the holes in each plateshaped member being applied in such a way that they are aligned with the holes of the other plateshaped members when the sheets are fully covering one another. The bolts 16 extend with their screwthreaded ends beyond the stack of members, nuts 17 being screwed on said ends. In FIG. 4 the nuts 17 have been screwed on the bolts 16 so far that the distance between those nuts and the heads 18 is equal to the total thickness of the plateshaped members 11, 12, 13, 14 and 15 when these are in an unloaded condition. When tightening the nuts 17, the members 12 and 14 of flexible material, laying between the rigid members 11 and 13, and 13 and 15 respectively, are compressed in axial direction, this causes them to expand in radial direction, and this produces the situation illustrated in FIG. 3. As a result of the radial deformation of the members 12 and 14, the slots 19 and 20 respectively in those members are getting narrower, because of which a clamping force is exerted by these slots on the sheets inserted therein. The clamping force may be adjusted by tightening the nuts 17 to a greater or lesser degree.

Figure 3:
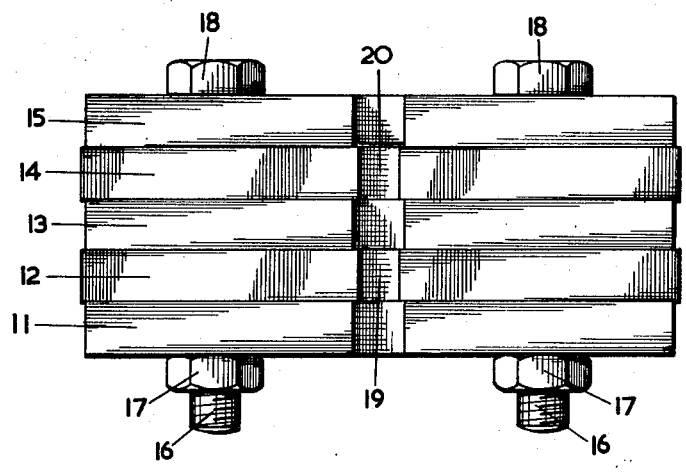
FIG. 3 shows a top view of the connector according to FIG. 2 in which the plateshaped members have been clamped against each other.
Figure 4:
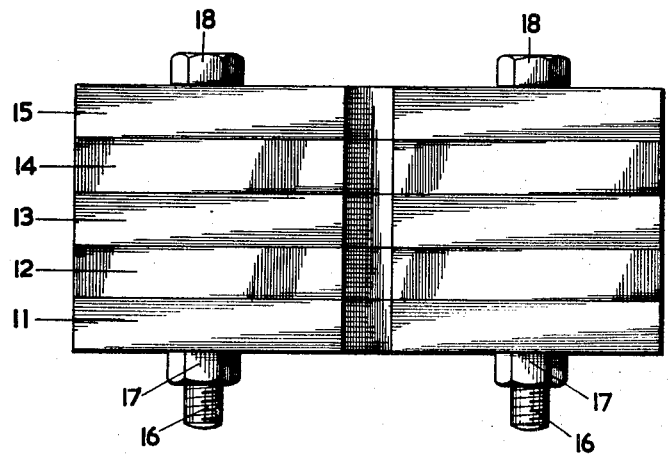
FIG. 4 shows a top view of the connector according to FIG. 2 in which the plateshaped members are resting against each other in an unclamped condition.

The members according to FIG. 2, 3 and 4 may be used for connecting sheet members with a thickness that is less than the original width of the slots in the elements.

Figure 5:
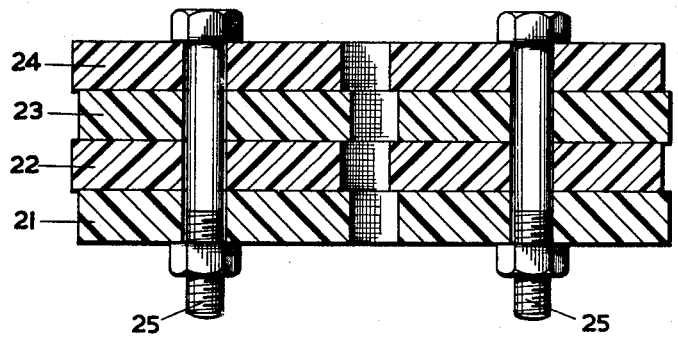
FIG. 5 shows a top view of another embodiment of a connector according to the invention which has been shown in an unused position.
Figure 6:
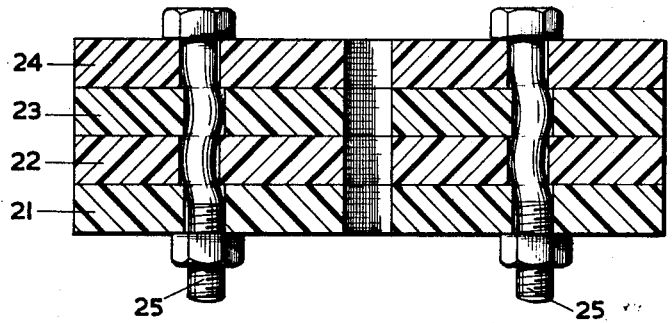
FIG. 6 shows the connector according to FIG. 5 in the position when a sheet has been fitted in the slot.

The connector shown by the FIGS. 5 and 6 is built up from four plateshaped members 21, 22, 23 and 24 of stiff material, said members being similar in form to the connecting element 1 in FIG. 1. The members 21, 22, 23 and 24 have been interconnected by pins 25, said pins being manufactured from flexible and deformable material. The pins are passed through holes in the plateshaped members. As contrasted with the embodiment according to FIGS. 2 to 4 inclusive, the holes of the successive plateshaped members are not aligned when the members are fully covering each other, but the holes in the members 22 and 24 are somewhat staggered with respect to the holes in the members 21 and 23. If the pins are provided through the holes, the members 21, 22, 23 and 24 move in relation to each other as shown in FIG. 5. The slots being present in these members are also moved in relation to each other as a result of this. When a sheet member is placed on the slots, these slots will be brought in line, because of which the openings in the successive members are moved again with respect to each other with the result that the pins 25 are flexibly deformed in the way shown by FIG. 6. The flexibly deformed pins will exert a force via the holes on the plateshaped members in the direction of the sheet placed in the slots, causing this sheet to be clamped down.

The connectors according to the invention may be used as standard elements for the connection of sheet members of various thicknesses and lengths. Furthermore, the element may be manufactures in a simple way owing to their simple design, while, because of their simple design, they do not disfigure the constructions built up with the aid of these elements.

It is noted that the invention is not limited to the embodiments of the connectors as described with reference to the enclosed drawings but that the connectors may be executed in some modified forms within the scope of this invention.

For example it might be necessary to remove some material from the part of the body of the plateshaped connectors according to FIG. 1 between the successive slots in order to increase its flexible properties in case these connectors are manufactured from relative rigid material, such as hardrubber. The material can be removed by providing holes in the parts of the body between the successive slots or by providing additional circumferential slots.

I claim:

1. Apparatus for interconnecting mutually perpendicular sheet members, said apparatus comprising:
   a. a plurality of connectors to be mutually spaced along the edges of the sheet members to be connected,
   b. said connectors each being formed as a single plate-shaped piece of relatively hard but flexibly and resiliently deformable material,
   c. said plate-shaped pieces each being formed with four slots therein extending inwardly from the periphery thereof, said slots mutually enclosing angles of 90°,
   d. said slots having widths smaller than the thicknesses of the sheet members to be interconnected thereby, so that forcing of the edge of a sheet member between the walls of a slot
      1. widens said slot and consequently resiliently deforms said resilient connector causing said sheet member to be clamped by the walls of said slot acting as clamping jaws, and
      2. deforms the connector in a manner tending to cause contraction of adjacent slots therein,
   and the insertion of each other sheet member into a slot of the connector
      3. increases the clamping force exerted by the walls of the slots on all of the sheet members being clamped thereby.

2. The combination of (A) apparatus as claimed in claim 1 with (B) a plurality of mutually perpendicular sheet members interconnected thereby, said sheet members having their edges into the slots of said connectors and mutually cooperating in deforming the same to increase the clamping force exerted by the walls of the slots on all of the plurality of sheet members clamped thereby.

3. A combination as claimed in claim 2, wherein four of said mutually perpendicular sheet members are interconnected by said connectors.

4. A combination as claimed in claim 2, said sheet members being of glass, and said connectors being of polyethylene.

5. Apparatus for interconnecting mutually perpendicular sheet members, said apparatus comprising:
   a. a plurality of connectors to be mutually spaced along the edges of the sheet members to be connected,
   b. said connectors each comprising
      1. a stack of plate-like members having four slots therethrough extending inwardly from the periphery thereof, said slots mutually enclosing angles of 90°,
      2. pin means interconnecting the members of said stack, said members being relatively stiff and said pin means being deformably resilient, said pin means extending through holes formed in said members, the holes in one of said members being staggered with respect to the holes in adjoining members so that alignment of the slots in the plate-like members resiliently distorts said pin means.

* * * * *